US012626691B1

(12) United States Patent
Monti et al.

(10) Patent No.: US 12,626,691 B1
(45) Date of Patent: May 12, 2026

(54) LANGUAGE MODEL HALLUCINATION MITIGATION USING CONTRASTIVE DECODING

(71) Applicant: Amazon Technologies, Inc., Seattle, WA (US)

(72) Inventors: Emilio Fabio Monti, Cambridge (GB); Jens Lehmann, Dresden (DE); Hitham Ahmed Assem Aly Salama, Cambridge (GB); Zheng Zhao, Edinburgh (GB)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 174 days.

(21) Appl. No.: 18/540,187

(22) Filed: Dec. 14, 2023

(51) Int. Cl.
　*G10L 15/22*　　　(2006.01)
　*G10L 15/06*　　　(2013.01)
　*G10L 15/16*　　　(2006.01)

(52) U.S. Cl.
　CPC ............ *G10L 15/16* (2013.01); *G10L 15/063* (2013.01); *G10L 15/22* (2013.01); *G10L 2015/223* (2013.01)

(58) Field of Classification Search
　CPC . G10L 15/22; G10L 15/1815; G10L 15/1822; G10L 15/30; G10L 15/16; G10L 15/063; G10L 2015/0631; G10L 2015/223; G10L 2015/085; G10L 15/18; G10L 15/197; G10L 15/183; G10L 25/30; G10L 17/18; G06F 40/30; G06F 40/216; G06F 16/3344; G06F 40/295; G06F 40/289; G06F 40/35; G06N 20/00; G06N 3/08; G06N 3/0464; G06N 3/044; G06N 3/0455

USPC .......................................................... 704/232
See application file for complete search history.

(56) References Cited

U.S. PATENT DOCUMENTS

| | | | |
|---|---|---|---|
| 12,175,220 B2 * | 12/2024 | Sundaresan ............. | G06F 8/427 |
| 12,175,968 B1 * | 12/2024 | AbdelHady ......... | G10L 15/1815 |
| 12,205,577 B1 * | 1/2025 | Kim ..................... | G10L 15/1815 |
| 12,254,878 B1 * | 3/2025 | Rottmann .............. | G10L 15/26 |
| 12,334,068 B1 * | 6/2025 | Wang ...................... | G06F 40/30 |
| 2021/0090575 A1 * | 3/2021 | Mahmood .............. | G10L 17/10 |
| 2023/0089285 A1 * | 3/2023 | Fan ......................... | G10L 15/22 |
| 2023/0110205 A1 * | 4/2023 | Guo ..................... | G10L 15/197 |
| | | | 704/235 |
| 2023/0142272 A1 * | 5/2023 | Bhowmik ............. | G06F 40/216 |
| | | | 704/9 |
| 2023/0317066 A1 * | 10/2023 | Hueser .................. | G10L 15/063 |
| | | | 704/243 |
| 2023/0342559 A1 * | 10/2023 | Bhardwaj .............. | G06N 20/00 |
| 2023/0351188 A1 * | 11/2023 | Fedus .................... | G06N 3/045 |

(Continued)

*Primary Examiner* — Vijay B Chawan
(74) *Attorney, Agent, or Firm* — K&L Gates LLP

(57)　　　ABSTRACT

Devices and techniques are generally described to mitigate hallucination for language models (LMs) using contrastive decoding. In various examples, first context data and first adversarial data may be determined based on a natural language input. First prompt including the natural language input, second prompt including the natural language input and the first context data, and third prompt including the natural language input and the first adversarial data may be generated. An LM may generate first vector of logits for the first prompt, second vector of logits for the second prompt, and third vector of logits for the third prompt. A decoder may generate first output data based on a combination of the first vector of logits, the second vector of logits, and the third vector of logits.

20 Claims, 8 Drawing Sheets

(56) References Cited

U.S. PATENT DOCUMENTS

| | | | |
|---|---|---|---|
| 2024/0112088 A1* | 4/2024 | Yu | H04N 19/46 |
| 2024/0282131 A1* | 8/2024 | Ren | G06V 10/7753 |
| 2024/0395024 A1* | 11/2024 | Hemani | G06F 40/40 |

* cited by examiner

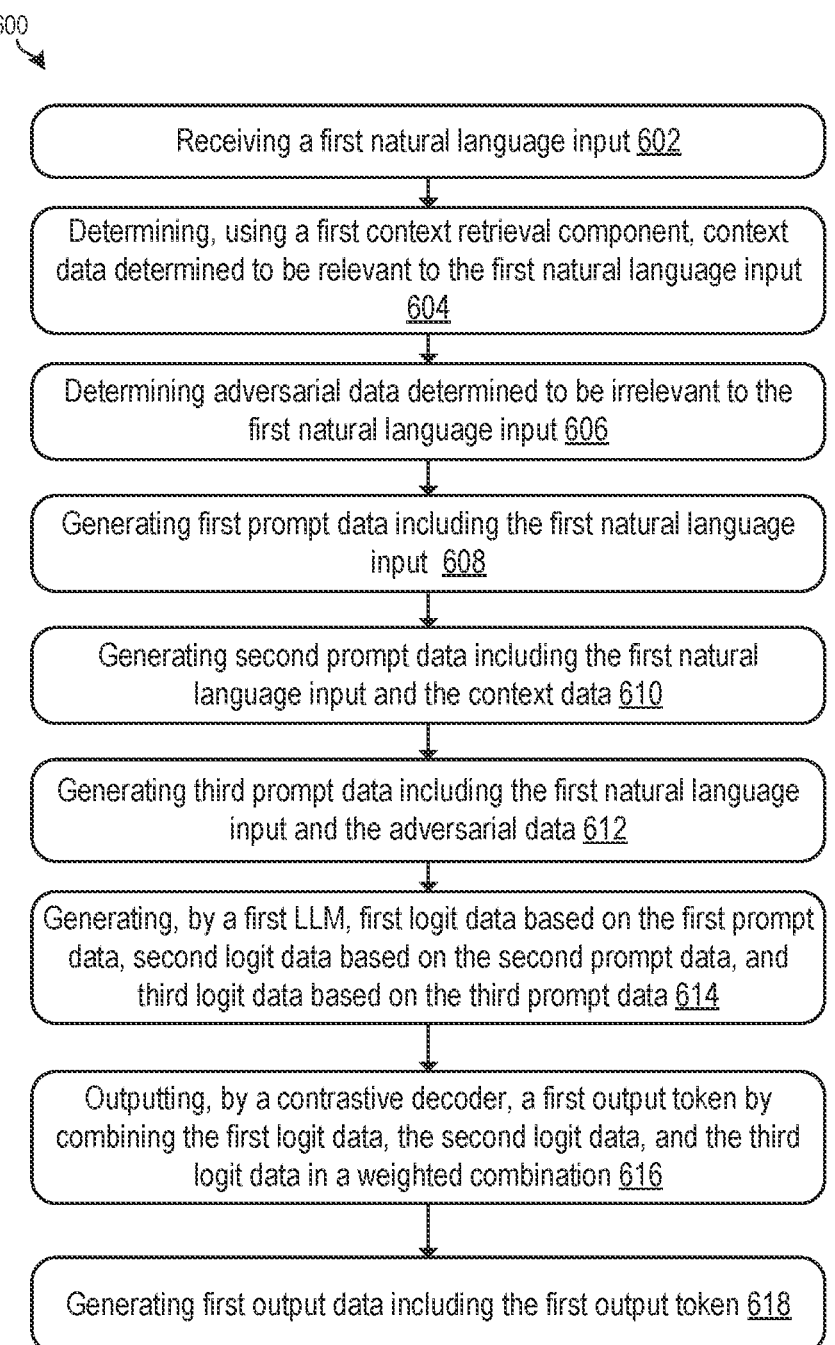

600

Receiving a first natural language input 602

Determining, using a first context retrieval component, context data determined to be relevant to the first natural language input 604

Determining adversarial data determined to be irrelevant to the first natural language input 606

Generating first prompt data including the first natural language input 608

Generating second prompt data including the first natural language input and the context data 610

Generating third prompt data including the first natural language input and the adversarial data 612

Generating, by a first LLM, first logit data based on the first prompt data, second logit data based on the second prompt data, and third logit data based on the third prompt data 614

Outputting, by a contrastive decoder, a first output token by combining the first logit data, the second logit data, and the third logit data in a weighted combination 616

Generating first output data including the first output token 618

FIG. 6

LANGUAGE MODEL HALLUCINATION MITIGATION USING CONTRASTIVE DECODING

BACKGROUND

People can interact with computing devices using spoken commands. In some systems, a "wakeword" is used to activate functionality. Natural language processing is used to transform the spoken requests that follow into a computer directive for performing a task.

SUMMARY

Devices and techniques are generally described to mitigate hallucination for language models (LMs) using contrastive decoding. In various examples, first context data and first adversarial data may be determined based on a natural language input. First prompt including the natural language input, second prompt including the natural language input and the first context data, and third prompt including the natural language input and the first adversarial data may be generated. An LM may generate first vector of logits for the first prompt, second vector of logits for the second prompt, and third vector of logits for the third prompt. A decoder may generate first output data based on a combination of the first vector of logits, the second vector of logits, and the third vector of logits.

BRIEF DESCRIPTION OF DRAWINGS

FIG. 6 is a flow chart illustrating an example process for LM inference using contrastive decoding, in accordance with embodiments of the present disclosure.

DETAILED DESCRIPTION

Figure 1:
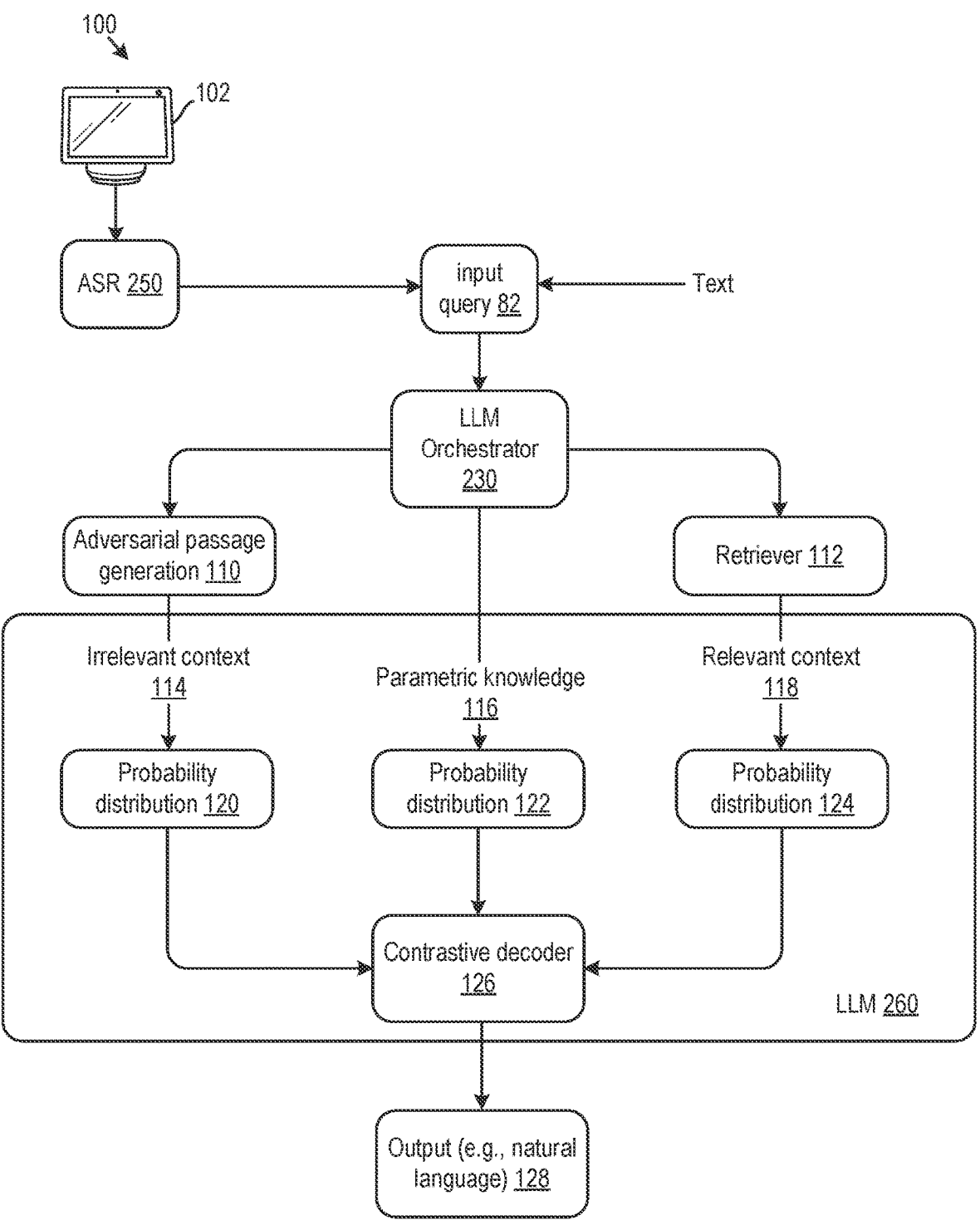
FIG. 1 is a flow diagram illustrating an example system for contrastive decoding for a language model (LM), in accordance with various aspects of the present disclosure.

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Devices with integrated processing capabilities are often configured with network communication capability and/or other computing functions allowing the devices to send data to and/or receive data from other devices. In some examples, such devices may include voice-enabled personal assistants and/or other natural language processing interfaces that may be used to control the devices, answer questions, communicate with other people/devices, and/or otherwise interact with the devices and/or other devices. As such devices become more and more prevalent in both the home, office, public spaces, quasi-public spaces (e.g., hotels, offices, retail spaces), and elsewhere generally, and as the technology matures, new services and features are being developed. For instance, in some cases devices may be paired or otherwise grouped together with one another to enable certain functionality. For example, a device that includes voice-based personal assistant functionality may be paired with a device including a display so that spoken commands may be used to control content output by the display device. In another example, content may be transferred from one device to another device in response to user requests and/or other triggering events (e.g., predefined user routines of actions, presence information, etc.).

Some natural language processing flows may employ one or more language models (LMs, such as large language models (LLMs)) in order to process natural language requests. An LLM is an artificial intelligence (AI) model that may be capable of processing and generating human-like text based on the latent information it has learned from vast amounts of training data. The term "large" refers to the size of these models in terms of the number of parameters or weights, which are the values that the model learns during training to make predictions and generate text. LLMs may have millions, billions (or even more) parameters, which enable such models to capture complex patterns and nuances in language that, in turn, allow the models to understand and generate more natural-sounding text (relative to previous approaches). Examples of LLMs include the generative pre-trained transformer models and even non-generative examples such as BERT (bidirectional encoder representations from Transformers), etc.

In a generative context, an LLM may generate text that is responsive to the input prompt provided to the LLM. LLMs excel at generating natural sounding text that appears as though it has been generated by a native speaker in the relevant language. In addition to fluency, generative LLMs are able to generate detailed, relevant, and largely accurate responses to input prompts in many cases based on the parametric knowledge learned by the LLM from the large amount of training data provided during training. In some cases, LLMs and/or associated systems may retrieve context for a given input query, which may include information that may be useful for responding to the given input query. For example, if the input query is about the population of a specific country, a webpage describing information about the specific country may be retrieved and the content of the webpage may be provided in the LLM prompt along with the input query. However, it is an open question to what degree a pre-trained language model (such as an LLM that has been pretrained without task-specific fine-tuning) balances its parametric knowledge with provided context during inference. In some examples, LMs may fail to pay enough attention to new information introduced as context (instead being overly reliant on the model's parametric knowledge), leading to potential hallucinations.

Hallucinations can occur due to the probabilistic nature of LLMs, which are trained to optimize the likelihood of their output based on input, sometimes leading to plausible sounding, but inaccurate or nonsensical outputs. For example, an LLM may generate plausible sounding (but non-existent) movie titles, may incorrectly identify a University as being in a city in which the University is not actually located, may respond confidently when asked about the weather forecast in a non-existent or fictional city, etc.

Described herein are novel systems and techniques that may be used to improve LM performance and reduce hallucinations by enabling the LM to better attend to relevant retrieved context. The proposed systems and techniques leverage contrastive decoding with negative context (e.g., "adversarial" context) at inference time to balance the LM's use of its parametric knowledge and the provided context when responding to a given input query. In some cases, a weighting parameter may be used to determine how much weight should be given by the LM's decoder to the retrieved context vs. the LM's parametric knowledge when predicting the next output token. In addition, various techniques are described for dynamically determining the weighting parameter so that the LM is able to dynamically decide, per input query (or at other levels of granularity), the proportional amount of attention that is to be paid to the context vs. the LM's parametric knowledge.

LMs are typically trained on large datasets that may include a wide variety of text from various sources, enabling the LMs to understand information regarding a large variety of topics (covered by the training data) including grammar, context, and the relationships between words and sentences (collectively, this information may be referred to as the model's parametric knowledge). In various examples described herein, a natural language processing flow may employ a LM to process a natural language request. In some examples, an LM-based natural language processing flow may generate a prompt from automatic speech recognition (ASR) output data representing a spoken user utterance. The prompt may be fed into the LLM. In other examples, a text input (e.g., text typed on a keyboard) may be used as an input prompt (or may be used to generate an input prompt) to the LM. The LM may be trained to output a text-based action plan which may be a formatted into a series of computer-executable actions (including application programming interface (API) calls to various subsystems) that may be taken in order to process the natural language request. In various examples, an LM-based processing flow may be a recursive process wherein the initial action plan may be executed (e.g., by making various API calls to API providers to receive results/responses), and the responses may be used to generate updated LM prompts which may then be input into the LM for generation of an updated action plan. In some cases, a LM-based processing flow may not use NLU to determine intent data, and may not route intent and/or slot data (e.g., named entities) to a skill or other natural language processing system. Instead, the action plan generated by the LM-based processing flow may use a series of function calls to take the necessary actions used to respond to the natural language request.

Automatic speech recognition (ASR) is a field of computer science, artificial intelligence, and linguistics concerned with transforming audio data associated with speech into text data and/or other ASR output data representative of that speech. In a voice assistant context, such as those described herein, ASR may be used to transform spoken utterances into text that can then serve as the input to an LM or other language model (e.g., natural language understanding (NLU), which is a field of computer science, artificial intelligence, and linguistics concerned with enabling computers to derive meaning from text input containing natural language, resulting in specific executable command data (e.g., intent data) or other type of instructions). Text-to-speech (TTS) is a field of computer science, artificial intelligence, and linguistics concerned with enabling computers to output synthesized speech. ASR, language models (e.g., natural language generative models such as some LLMs), and TTS may be used together as part of a natural language processing system. As used in, natural language input data may comprise audio data (e.g., representing a user request or command), text data, and/or other representation data representing natural language for input into a natural language processing system.

The various techniques described herein may be used in a variety of contexts, including in natural language processing enabled devices (e.g., devices employing voice control and/or speech processing "voice assistants") and/or systems.

Natural language processing enabled devices may include one or more microphones (e.g., far-field microphone arrays) used to transform audio into electrical signals. Speech processing may then be performed, either locally by the speech processing enabled device, by one or more other computing devices communicating with the speech processing enabled device over a network, or by some combination of the natural language processing enabled device and the one or more other computing devices. In various examples, natural language processing enabled devices may include and/or may be configured in communication with speakers and/or displays effective to output information obtained in response to a user's spoken request or command, and/or to output content that may be of interest to one or more users.

Storage and/or use of data related to a particular person or device (e.g., device identifier data, device names, names of device groups, contextual data, and/or any personal data) may be controlled by a user using privacy controls associated with a speech processing enabled device and/or a companion application associated with a speech processing enabled device. Users may opt out of storage of personal, device state (e.g., a paused playback state, etc.), and/or contextual data and/or may select particular types of personal, device state, and/or contextual data that may be stored while preventing aggregation and storage of other types of personal, device state, and/or contextual data. Additionally, aggregation, storage, and use of personal, device state, and/or contextual information, as described herein, may be compliant with privacy controls, even if not legally subject to them. For example, personal, contextual, device state, and other data described herein may be treated as if it was subject to acts and regulations, such as the Health Insurance Portability and Accountability Act (HIPAA) and the General Data Protection Regulation (GDPR), even if it is not actually subject to these acts and regulations. In various examples, the device and/or device group names and/or any data captured by such devices may be used only in accordance with user permission, in compliance with any relevant laws and/or policies. Additionally, users may opt out of data collection, and/or may opt to delete some or all of the data used by the various techniques described herein, even where deletion or non-collection of various data may result in reduced functionality and/or performance of various aspects of the systems described herein.

In various examples, a natural language processing enabled device may include a wakeword detection component. The wakeword detection component may process audio data captured by microphones of the speech processing enabled device and may determine whether or not a keyword and/or phrase, which are collectively sometimes referred to herein as a "wakeword", is detected in the audio data. In some examples, when a wakeword is detected, the speech processing enabled device may enter a "sending mode," "audio capturing mode," and/or other type of processing mode in which audio detected by the microphones following the wakeword (e.g., data representing user request data spoken after the wakeword) may be sent to natural language processing computing component(s) (either locally or remotely) for further natural language processing (e.g., ASR, NLU, LLM inference, etc.). In various examples, the wakeword detection component may be used to distinguish between audio that is intended for the natural language processing system and audio that is not intended for the natural language processing system.

Machine learning techniques, such as those described herein, are often used to form predictions, solve problems, recognize objects in image data for classification, etc. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is often referred to as back propagation.

Transformer models are machine learning models that include an encoder network and a decoder network. LLMs are often implemented using transformer models. The encoder takes an input (e.g., a "prompt") and generates feature representations (e.g., feature vectors, feature maps, etc.) of the input. The feature representation is then fed into a decoder that may generate an output based on the encodings. In natural language processing, transformer models take sequences of words as input. A transformer may receive a sentence and/or a paragraph (or any other quantum of text) comprising a sequence of words as an input.

The encoder network of a transformer comprises a set of encoding layers that processes the input data one layer after another. Each encoder layer generates encodings (referred to herein as "tokens"). These tokens include feature representations (e.g., feature vectors and/or maps) that include information about which parts of the input data are relevant to each other. Each encoder layer passes its token output to the next encoder layer. The decoder network takes the tokens output by the encoder network and processes them using the encoded contextual information to generate an output (e.g., the aforementioned one-dimensional vector of tokens). The output data may be used to perform task-specific functions (e.g., action plan generation for an LLM-based natural language processing flow, etc.). To encode contextual information from other inputs (e.g., combined feature representation), each encoder and decoder layer of a transformer uses an attention mechanism, which for each input, weighs the relevance of every other input and draws information from the other inputs to generate the output. Each decoder layer also has an additional attention mechanism which draws information from the outputs of previous decoders, prior to the decoder layer determining information from the encodings. Both the encoder and decoder layers have a feed-forward neural network for additional processing of the outputs, and contain residual connections and layer normalization steps.

Scaled Dot-Product Attention

The basic building blocks of the transformer are scaled dot-product attention units. When input data is passed into a transformer model, attention weights are calculated between every token simultaneously. The attention unit produces embeddings for every token in context that contain information not only about the token itself, but also a weighted combination of other relevant tokens weighted by the attention weights.

Concretely, for each attention unit the transformer model learns three weight matrices; the query weights $W_Q$, the key weights $W_K$, and the value weights $W_V$. For each token i, the input embedding $x_i$ is multiplied with each of the three weight matrices to produce a query vector $q_i = x_i W_Q$, a key vector $k_i = x_i W_K$, and a value vector $v_i = x_i W_V$. Attention weights are calculated using the query and key vectors: the attention weight $a_{ij}$ from token i to token j is the dot product between $q_i$ and $k_j$. The attention weights are divided by the square root of the dimension of the key vectors, $\sqrt{d_k}$, which stabilizes gradients during training. The attention weights are then passed through a softmax layer that normalizes the weights to sum to 1. The fact that $W_Q$ and $W_K$ are different matrices allows attention to be non-symmetric: if token i attends to token j, this does not necessarily mean that token j will attend to token i. The output of the attention unit for token i is the weighted sum of the value vectors of all tokens, weighted by $a_{ij}$, the attention from i to each token.

The attention calculation for all tokens can be expressed as one large matrix calculation, which is useful for training due to computational matrix operation optimizations which make matrix operations fast to compute. The matrices Q, K, and V are defined as the matrices where the ith rows are vectors $q_i$, $k_i$, and $v_i$ respectively.

$$\text{Attention}(Q, K, v) = \text{softmax}\left(\frac{QK^T}{\sqrt{d_k}}\right)V$$

Multi-Head Attention

One set of $(W_Q, W_K, W_V)$ matrices is referred to herein as an attention head, and each layer in a transformer model has multiple attention heads. While one attention head attends to the tokens that are relevant to each token, with multiple attention heads the model can learn to do this for different definitions of "relevance." The relevance encoded by transformers can be interpretable by humans. For example, in the natural language context, there are attention heads that, for every token, attend mostly to the next word, or attention heads that mainly attend from verbs to their direct objects. Since transformer models have multiple attention heads, they have the possibility of capturing many levels and types of relevance relations, from surface-level to semantic. The multiple outputs for the multi-head attention layer are concatenated to pass into the feed-forward neural network layers.

Each encoder comprises two major components: a self-attention mechanism and a feed-forward neural network. The self-attention mechanism takes in a set of input encodings from the previous encoder and weighs their relevance to each other to generate a set of output encodings. The feed-forward neural network then further processes each output encoding individually. These output encodings are finally passed to the next encoder as its input, as well as the decoders.

The first encoder takes position information and embeddings of the input data as its input, rather than encodings. The position information is used by the transformer to make use of the order of the input data. In various examples described herein, the position embedding may describe an order of a sequence of words.

Each decoder layer comprises three components: a self-attention mechanism (e.g., scaled dot product attention), an attention mechanism over the encodings, and a feed-forward neural network. The decoder functions in a similar fashion to the encoder, but an additional attention mechanism is inserted which instead draws relevant information from the encodings generated by the encoders. In a self-attention layer, the keys, values and queries come from the same place—in the case of the encoder, the output of the previous layer in the encoder. Each position in the encoder can attend to all positions in the previous layer of the encoder. In "encoder-decoder attention" layers (sometimes referred to as "cross-attention"), the queries come from the previous decoder layer, and the keys and values come from the output of the encoder. This allows every position in the decoder to attend over all positions in the input sequence. The decoder is attending to the encoder features.

FIG. 1 is a flow diagram illustrating an example system 100 for contrastive decoding for a language model (LM), in accordance with various aspects of the present disclosure. In the example depicted in FIG. 1, an input device 102 may receive a spoken query (e.g., a spoken natural language request, sometimes referred to as an utterance). ASR may be used to convert the spoken request to text or other data representations of the spoken request. However, in other examples, system 100 may not include a speech processing enabled device, such as input device 102. Instead, the input query 82 may be received from other sources (e.g., from a remote system). The input query 82 may be the transcribed spoken utterance previously discussed or may be directly input as text (e.g., a natural language question, command, etc.). The input query 82 may include source code, a user question, a user command (e.g., "Turn on the kitchen light"), and/or input of one or more different modalities (e.g., an input image, video, audio, etc.).

In the example of FIG. 1, the input query 82 may be sent to an LLM orchestrator 230. In various examples, the input query 82 may be included in three separate LLM inferencing requests sent to LLM orchestrator 230. The LLM orchestrator 230 may be any component and/or logic that takes a given input query 82 and generates the three different prompts for LLM inference, as described herein. These separate LLM inferencing processing flows depicted in FIG. 1 may be executed in parallel or serially, as desired. In a first LLM inferencing process flow, prompt data may be generated for LLM inference that includes only the input query 82 itself without any retrieved context. Accordingly, the LLM 260 may employ its parametric knowledge 116 learned during training during inference to generate probability distribution 122. As described in further detail below, probability distribution 122 may be a vector of logits (e.g., a vector of non-normalized scores/predictions where each element represents a different output token learned by the LLM 260 during training) and/or a vector of probabilities for each possible output token of the LLM 260 (e.g., if softmax is applied to the raw scores of the logit to obtain normalized, per-token probabilities).

In a second LLM inferencing process flow, a retriever component 112 may be used to retrieve relevant context 118 that may be relevant to the input query 82. For example, the retriever component 112 may be a search engine that is used to search an external corpus (e.g., a knowledge base, the Internet, etc.) for information that is relevant to the query. For example, the retriever component 112 may return text from one or more websites determined to be relevant to the input query 82. The relevant context 118 (e.g., context data retrieved for the specific input query 82) may be included in prompt data for LLM inferencing. In addition to the relevant context 118 the prompt data may also include the input query 82. The relevant context 118 may be used to augment the LLM 260's parametric knowledge during inference to generate probability distribution 124. Similar to probability distribution 122, the probability distribution 124 may be a vector of logits representing per-token scores/predictions. Additionally, in some examples, softmax may be applied to generate normalized, per-token probabilities for the logits. In various examples, the LLM orchestrator 230 may prompt the LLM 260 (e.g., using LLM prompt generation component 250) to employ retriever component 112 to retrieve relevant context for the input query 82 (e.g., by specifying an API of the retriever component 112 in the prompt and/or instructing the LLM 260 to use the retriever component 112 to retrieve context for the input query 82).

Additionally, in a third LLM inferencing process flow, adversarial passage generation 110 may be used to generate irrelevant context 114 (adversarial data) that is irrelevant to the input query 82. This irrelevant context 114 may be generated in various ways. For example, the irrelevant context 114 may include nonsensical information that may be static for different input queries 82. In some other examples, the irrelevant context 114 may be randomly sampled from a large corpus of external data (and therefore may be highly likely to be irrelevant to the input query 82). In still further examples, the relevant context 118 may be embedded (e.g., using an encoder such as BERT, DistilBERT, Word2vec, etc.). A distance metric (e.g., cosine similarity, Euclidean distance, cosine distance) may be used to find an embedding that is a large distance (e.g., a maximum distance among embeddings in the embedding space and/or greater than a threshold distance in the embedding space) from the relevant context embedding. The retrieved embedding may be used as irrelevant context 114. The purpose of the irrelevant context 114 (e.g., adversarial data) may be to serve as a negative contrastive input, as described in further detail below. Similar to the other two processing flows, prompt data may be generated that includes the irrelevant context 114 (e.g., the adversarial data) and the input query 82. This prompt data may be sent to the LLM 260 for inference and probability distribution 120 may be generated. Similar to encoded outputs 122, 124, the probability distribution 120 may be a vector of logits representing per-token scores/predictions. Additionally, in some examples, softmax may be applied to generate normalized, per-token probabilities for the logits. In various examples, the LLM orchestrator 230 may prompt the LLM 260 (e.g., using LLM prompt generation component 250) to employ adversarial passage generation 110 to generate irrelevant context 114 for the input query 82 (e.g., by specifying an API of the retriever component 112 in the prompt and/or instructing the LLM 260 to use the adversarial passage generation 110 to generate irrelevant context for the input query 82).

Contrastive decoder 126 may linearly (or otherwise) combine the three encoded outputs 120, 122, 124 using a scalar weight parameter a (e.g., a weight value). The re-weighting allows the LLM 260 to focus on the most relevant knowledge (e.g., among the LLM 260's parametric knowledge 116 and the relevant context 118) and mitigate the effects of irrelevant or contradictory information (e.g., the adversarial data). This contrastive mixture of LLM inferencing may enable more faithful and/or accurate responses as compared to models that use either parametric or non-parametric (contextual) knowledge alone during inference.

The vector of logits resulting from the linear combination may be decoded using any desired decoding technique (e.g., greedy decoding, beam search, etc.) to predict the output token at the current timestep (e.g., output 128).

For example, LLM 260 may be defined as (parameterized by) $\theta$, x may be the input query 82, y may be the output token (response), $c^+$ may be the relevant context 118, and $c^-$ may be the adversarial data (irrelevant context 114). Given this formulation, the following probability distributions (e.g., vectors of logits) are generated using the above-described three processing flows during inference:

$Z_t$: $logit_\theta(y_t|x, y_{<t})$—LLM 260 inference using only parametric knowledge 116;

$$Z_t^+: logit_\theta(y_t|c^+, x, y_{<t}) - LLM\ 260$$

inference using relevant context 118; and $$Z_t^+: logit_\theta(y_t|c^+, x, y_{<t}) - LLM\ 260$$

inference using irrelevant context 114.

Then, to predict the next token $y_t$ a combined logit may be generated using:

$$y_t \sim softmax[Z_t + \alpha(Z_t^+ - Z_t^-)],$$

where $\alpha$ may be used to modulate the relative amounts of parametric knowledge and contextual knowledge used to generate the output token at time step t. The motivation behind subtracting the vector of logits representing the model response generated using irrelevant context $$(Z_t^-)$$

from the vector of logits representing the model response using relevant context 118

$$(Z_t^+)$$

may be to remove noise from LM inference.

The value of $\alpha$ may be determined for different datasets and/or instantiations of the retriever component 112. In addition, as described in further detail below, $\alpha$ may be dynamically determined per input query, per dialog session, per output token, and/or at any desired level of granularity. One example approach for dynamic determination of a may be to train the model (e.g., an LM such as LLM 260) to learn an optimal value for $\alpha$ for each input query using reinforcement learning. An example of such an approach is described in further detail below in reference to FIG. 3B. Another example approach for dynamic determination of $\alpha$ may be to use the LM's predicted confidence in its answer to each specific query. For example, if the response generated using parametric knowledge 116 has a higher confidence score relative to the response generated using the relevant context 118, $\alpha$ may be set at a relatively low value. Conversely, if the response generated using parametric knowledge 116 has a lower confidence score relative to the response generated using the relevant context 118, $\alpha$ may be set at a relatively high value so that LM decoding attends more to the relevant context 118 than the LM's parametric knowledge 116. An example of such an approach is described in reference to FIG. 3A.

Figure 2:
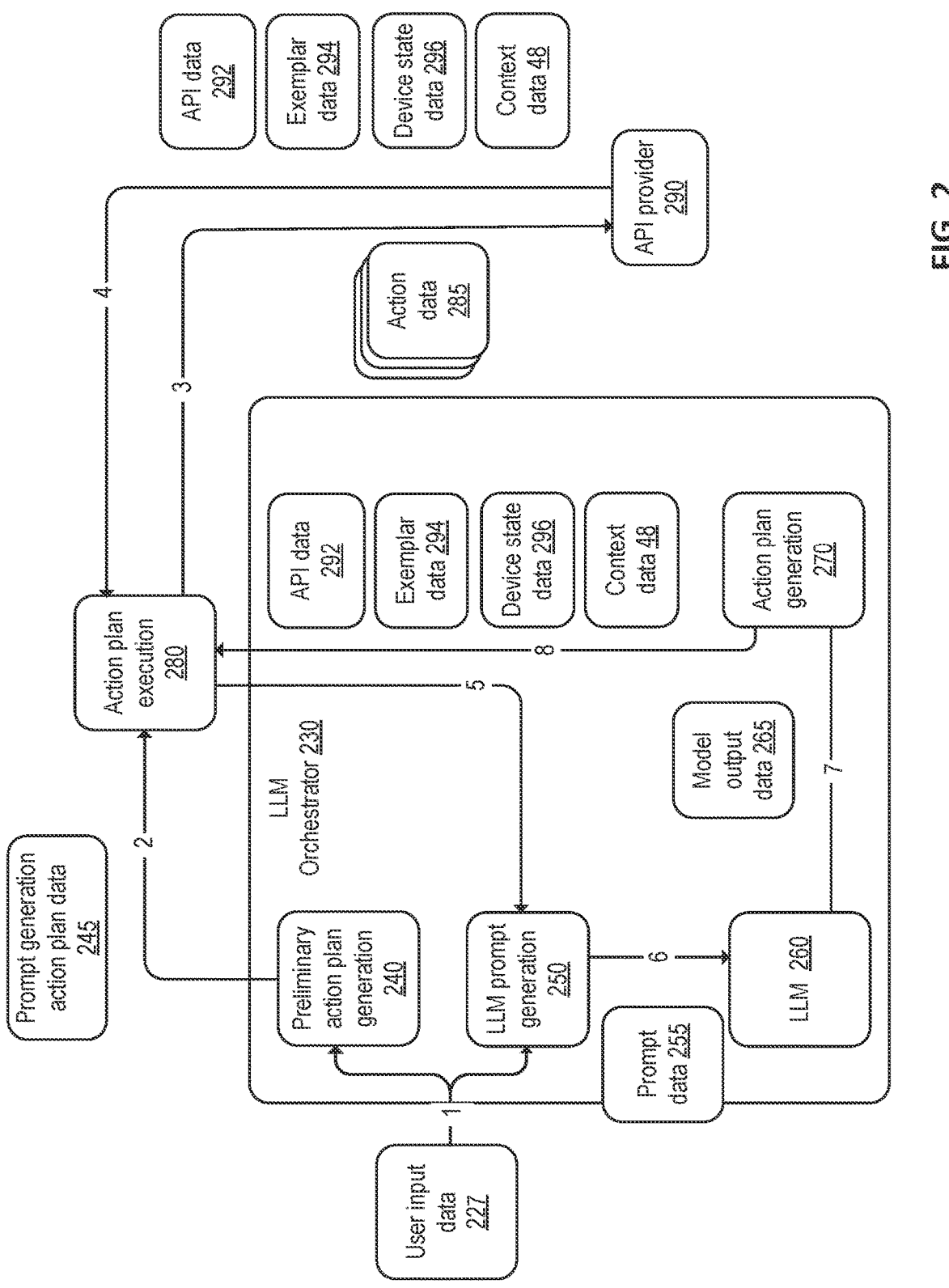
FIG. 2 depicts an example LLM-based natural language processing flow, in accordance with various aspects of the present disclosure.

FIG. 2 depicts an example LLM-based natural language processing flow (e.g., of LLM 260 described above), in accordance with various aspects of the present disclosure. Various components described in reference to FIG. 1 may be included in the architecture of FIG. 2 although they may not be specifically shown in the example. The example architecture in FIG. 2 includes an LLM orchestrator 230 and various other components for determining an action responsive to a user input. The architecture may further include an action plan execution component 280 and an application programming interface (API) provider component 290. With reference to FIG. 2, the LLM orchestrator 230 may include a preliminary action plan generation component 240, a LLM prompt generation component 250, an LLM 260, and an action plan generation component 270. In various examples, the LLM 260 may be a generative model.

In some examples, the LLM 260 may be a transformer-based seq2seq model involving an encoder-decoder architecture. In some such embodiments, the LLM 260 may be a multilingual (approximately) 20 billion parameter seq2seq model that is pre-trained on a combination of denoising and Causal Language Model (CLM) tasks in various languages (e.g., English, French, German, Arabic, Hindi, Italian, Japanese, Spanish, etc.), and the LLM 260 may be pre-trained with approximately 1 trillion tokens. Being trained on CLM tasks, the LLM 260 may be capable of in-context learning. An example of such a LLM is Alexa Teacher Model (Alexa™).

In various examples, the input to the LLM 260 may be in the form of a prompt. A prompt may be a natural language input, for example, an instruction, for the LLM 260 to generate an output according to the prompt. The output generated by the LLM 260 may be a natural language output responsive to the prompt. The prompt and the output may be text in a particular spoken language. For example, for an example prompt "how do I cook beans?", the LLM 260 may output a recipe (e.g., a step-by-step process) to cook beans. As another example, for an example prompt "I am hungry. What restaurants in the area are open?", the LLM may output a list of restaurants near the user that are open at the current time. As described above in reference to FIG. 1, inference may be performed multiple times by LLM 260 using different prompts. For example, a first prompt may include only the input query (e.g., user input data 227), while a second prompt may include the input query and contextual data (e.g., relevant context 118 which may be an example of context data 48 retrieved via an API provider component 290) retrieved for the specific input query. A third prompt may include the adversarial data (e.g., irrelevant context 114).

The LLM 260 may be configured using various learning techniques. For example, in some embodiments, the LLM 260 may be configured (e.g., "fine tuned") using few-shot learning. In few-shot learning, the model learns how to learn to solve the given problem. In this approach, the model is provided with a limited number of examples (i.e., "few shots") from the new task, and the model uses this information to adapt and perform well on that task. Few-shot learning may require fewer amount of training data than implementing other fine-tuning techniques. For further example, in some embodiments, the LLM 260 may be configured using one-shot learning, which is similar to few-shot learning, except the model is provided with a single example. As another example, in some embodiments, the LLM 260 may be configured using zero-shot learning. In zero-shot learning, the model solves the given problem without examples of how to solve the specific/similar problem and just based on the model's training dataset. In this approach, the model is provided with data sampled from a class not observed during training, and the model learns to classify the data.

The LLM orchestrator 230 may be configured for generating the prompt to be used by the LLM 260 to determine an action responsive to a user input. As shown in FIG. 2, the LLM orchestrator 230 receives (at step 1) user input data 227. In some instances, the user input data 227 may correspond to a text or tokenized representation of a user input. For example, prior to the LLM orchestrator 230 receiving the user input data 227, another component (e.g., an ASR component) may receive audio data representing the user input. The ASR component may perform ASR processing on the audio data to determine ASR output data corresponding to the user input. As previously described, the ASR component may determine ASR data that includes an ASR N-best list including multiple ASR hypotheses and corresponding confidence scores representing what the user may have said. The ASR hypotheses may include text data, token data, etc. as representing the input utterance. The confidence score of each ASR hypothesis may indicate the ASR component's level of confidence that the corresponding hypothesis represents what the user said. The ASR component may also determine token scores corresponding to each token/word of the ASR hypothesis, where the token score indicates the ASR component's level of confidence that the respective token/word was spoken by the user. The token scores may be identified as an entity score when the corresponding token relates to an entity. In some instances, the user input data 227 may include a top scoring ASR hypothesis of the ASR data.

As illustrated in FIG. 2, the user input data 227 may be received at the preliminary action plan generation component 240 and the LLM prompt generation component 250 of the LLM orchestrator 230. The preliminary action plan generation component 240 processes the user input data 227 to generate prompt generation action plan data 245 corresponding to an instruction(s) (e.g., a request(s)) for one or more portions of data usable to generate a language model prompt for determining an action responsive to the user input). In some examples, the one or more portions of data may be data that is determined to be relevant for processing of the user input. The one or more portions of data may represent one or more actions (e.g., API definitions), one or more exemplars corresponding to the actions (e.g., example model outputs including an appropriate use of the API), one or more device states corresponding to one or more devices associated with the user input, and/or one or more other contexts associated with the user input. For example, if the user input data 227 represents a user input of "please turn on the kitchen lights every morning at 7 am," then the preliminary action plan generation component 240 may determine prompt generation action plan data 245 representing instructions for one or more actions (e.g., API definitions) related to turning on the kitchens lights every morning, one or more exemplars corresponding to the related actions, one or more device states corresponding to one or more devices associated with the "kitchen lights", and one or more other contexts. For further example, if the user input data 227 represents a user input of "What is the elevation of Mt. Everest," then the preliminary action plan generation component 240 may determine prompt generation action plan data 245 representing instructions for one or more actions (e.g., API definitions, specifications, schemas) related to the user input and one or more exemplars corresponding to the related actions, as other information, such as devices states or other contextual information (user profile information, device profile information, weather, time of day, historical interaction history) may not be relevant. The preliminary action plan generation component 240 may be an example of the retriever component 112 and may be used to determine relevant context 118 (e.g., context data 48) relevant to the user input query by calling one or more APIs as described below. In addition, the preliminary action plan generation component 240 may retrieve and/or generate the irrelevant context 114 (i.e., adversarial data) that may be included in a separate prompt relative to the prompt including the relevant context and the prompt used by the LLM 260 to respond to the input query using only its parametric knowledge 116.

In some examples, the prompt generation action plan data 245 may include one or more executable API calls usable for retrieving the one or more portions of data from the corresponding component. For example, instructions included in the prompt generation action plan data 245 may include "FETCH_API," "FETCH_EXEMPLAR," "FETCH_DE-VICE_STATE," "FETCH_CONTEXT," etc., along with optional API arguments/inputs. In some embodiments, the prompt generation action plan data 245 may also include the user input data 227. The prompt generation action plan data 245 may be sent (at step 2) to the action plan execution component 280.

In some examples, the preliminary action plan generation component 240 may be configured to process the user input data 227 to determine a representation of the user's request. In various examples, the representation of the user's request may be a reformulation of the user's request. For example, the if the user input data 227 represents a user input of "I have always wanted to travel to Japan, I have heard it's beautiful. How tall is Mt. Fuji?", then the preliminary action plan generation component 240 may determine the representation of the user's request as being "How tall is Mt. Fuji," or the like. The preliminary action plan generation component 240 may generate the prompt generation action plan data 245 using the determined representation of the user's request.

In some examples, the preliminary action plan generation component 240 may implement one or more machine learning (ML) models. A first ML model(s) may be configured to take as input the user input data 227 and generate a representation of the user's request. For example, the ML model may be a text summarization model or a text rewrite model. A second ML model (or the first ML model) may be configured to take as input the representation of the user's request (or the user input data 227) and determine the one or more portions of data relevant for processing of the user input. For example, the second ML model may be a classifier trained to classify the user's request (or the user input data 227) to determine data (or types of data) relevant to the processing of the user input (e.g., one or more related actions (e.g., API definitions), one or more exemplars corresponding to the one or more related actions, one or more device states corresponding to one or more related devices, one or more related contexts, etc.)

In other embodiments, the preliminary action plan generation component 240 may be an LLM, similar to the LLM 260. In such embodiments, the architecture (e.g., LLM 260) may include a further component configured to generate a prompt to be provided to the LLM (e.g., similar to the LLM prompt generation component 250) or the prompt may be generated by the LLM prompt generation component 250. The component may generate a prompt (e.g., according to a template) including the user input data 227 and instructions to determine the one or more portions of data (or types of data) relevant to the processing of the user input. The LLM may process the prompt and generate model output data representing the one or more portions of data (or types of data). The preliminary action plan generation component 240 may process the model output data to determine the prompt generation action plan data 245.

The action plan execution component 280 may process the prompt generation action plan data 245 to execute the one or more instructions to retrieve/receive data corresponding to the user input and that may be used to generate the language model prompt. As shown in FIG. 2, the action plan execution component 280 processes the prompt generation action plan data 245 to generate action data 285 representing an action included in the prompt generation action plan data 245 (e.g., a single instruction, such as FETCH_CONTEXT). For example, in the situation where the action is represented by an API call, the action data 285 may represent the action plan execution component 280 executing the API call included in the prompt generation action plan data 245. The action data 285 may be sent (at step 3) to the API provider component 290. In the situation where the prompt generation action plan data 245 includes more than one instruction, the action plan execution component 280 may generate more than one instance of action data 285 (e.g., one instance for each instruction included in the prompt generation action plan data 245) and send each instance to the API provider component 290.

The API provider component 290 may process the (one or more instances of the) action data 285 and cause the retrieval of the (one or more portions of) data associated with the action data 285. The API provider component 290 may include a knowledge provider component. The knowledge provider component may include an API retrieval component, an exemplar retrieval component, a device state retrieval component, and an "other" context retrieval component. The knowledge provider component may provide the action data 285 to the component(s) configured to determine the data corresponding to the request(s) represented by the action data 285.

For example, the API retrieval component (not shown) may process the action data 285 to generate API data 292 representing one or more APIs that correspond to an action performable with respect to the user input. For example, if the user input corresponds to "turn on the kitchen light," the API retrieval component may determine an API usable to control a device and include an API definition corresponding to the API in the API data 292. In some embodiments, the API definition may include one or more API call frameworks for instructing/requesting that the API perform an action (e.g., turn_on_device (device: [device name]), turn_off_device (device: [device name]), set_device_temperature (device: [device name]); temperature: [temperature], set_device_volume (device: [device name]; volume: [volume value]), etc.). In some embodiments, the API definition may include a natural language description of the functionality of the API (e.g., a natural language description of the actions performable by the API/API call framework). For example, for the abovementioned API determined to be associated with the user input of "turn on the kitchen light," the API definition may further include a natural language description of "used to power on a device." In some embodiments, the one or more API definitions may be included in the API data 292 based on them being semantically similar to the user input. For example, the API retrieval component may be capable of comparing (e.g., using cosine similarity) (an encoded representation of) the user input to (an encoded representation of) the API definition to determine a semantic similarity between the user input and the API definition (e.g., a semantic similarity between the user input and the natural language description of the functionality of the API included in the API definition). If the API definition is determined to be semantically similar to the user input, then the corresponding API definition may be included in the API data 292. In some embodiments, the API retrieval component may include the top-n identified API definitions in the API data 292. The API data 292 may be sent (at step 4) to the action plan execution component 280 as shown in FIG. 2.

For further example, the exemplar retrieval component may process the action data 285 to generate exemplar data 294 representing one or more exemplars associated with one or more APIs (e.g., the API represented by the API data 292). As used herein, an "exemplar" associated with an API corresponds to an example use of the API (e.g., an example language model output including use of the API (e.g., via a corresponding API call) with respect to a user input, where the user input is similar to the current user input. For example, for an API associated with the API call framework "turn_on_device (device: [device name])," and the current user input "please turn on the kitchen lights" the exemplar retrieval component may select an exemplar including the example user input of "please turn on the lights" and the API call of "turn_on_device (device="lights")." In some embodiments, an exemplar represented in the exemplar data 294 may include an example user input, a natural language description of an action associated with the example user input, an executable API call associated with the example user input and the action associated with the example user input, an example result of the API call, a natural language description of an action to be performed in response to the example result of the API call, and/or an output responsive to the user input. For example, for an API associated with the API call frameworks "Routine.create_turn_on_action(device: str)" and "Routine.create_time_trigger(hour: [hour value])" and the current user input "please turn on the kitchen light everyday at 7 am," the exemplar retrieval component may select an exemplar representing:

```
{
    Customer: turn on the kitchen light everyday at 7 am
    Thought: the customer is trying to create a routine
    Action:
    Routine.create_routine(trigger-Routine.create_time_trig-
        ger (hour=
    7),                        action=Routine.create_turn_on_action
        (device="kitchen light"))
    Observation: routine created successfully
    Thought: time to respond
    Response: I have created a routine for you. Anything else?
}
```

Although not illustrated in FIG. 2, in some embodiments, the API provider component 290 and/or a knowledge provider component may provide the exemplar retrieval component with the action data 285 and a list of API call(s) to which the determined exemplars are to be associated (e.g., the API call(s) included in the API data 292). In some embodiments, the one or more exemplars may be included in the exemplar data 294 based on them being semantically similar to the user input. For example, the exemplar retrieval component may be capable of comparing (e.g., using cosine similarity) the current user input to the example user input included in an exemplar to determine a semantic similarity between the current user input and the example user input. If the example user input is determined to be semantically similar to the current user input, then the corresponding exemplar may be included in the exemplar data 294. In some embodiments, the exemplar retrieval component may include the top-n identified exemplars in the exemplar data 294. The exemplar data 294 may be sent (at step 4) to the action plan execution component 280 as shown in FIG. 2.

As another example, a device state retrieval component (not shown in FIG. 2) may process the action data 285 to generate device state data 296 representing one or more states of one or more devices associated with/relevant to the user input (e.g., whether the device is powered on or off, a volume level associated with the device, etc.). For example, if the user input corresponds to "Please turn on the kitchen light," the device state data 296 may represent the state(s) of one or more devices that are associated with a functionality of turning on a light, are associated with the kitchen, are associated with a user profile of a user who provided the user input, etc. In some embodiments, the device(s) may be determined to be relevant based on a device location(s). For example, devices (e.g., microwave, oven, fridge, smart speaker, etc.) near the user device (e.g., located in the kitchen) that received the user input may be used to determine the device state data 296. In some embodiments, the one or more devices may be determined to be relevant to the user input based on device profile information. For example, the device state retrieval component may be capable of comparing device profile information for a device (e.g., device ID, device group ID, a location associated with the device, etc.) to the user input to determine whether the device is relevant to the user input. In some embodiments, the device state retrieval component may include the top-n identified device states in the device state data 296. The device state data 296 may be sent (at step 4) to the action plan execution component 280 as shown in FIG. 2.

As a further example, a context retrieval component (not shown) may process the action data 285 to generate other context data 48 (apart from the device state data 296, the API data 292, the exemplar data 294, etc.) representing one or more contexts associated with/relevant to the user input. For example, the other context data 48 may represent user profile information (age, gender, associated devices, user preferences, etc.), visual context (e.g., content being displayed by devices associated with the user profile, content being displayed by the user device that captured the user input, etc.), knowledge context (e.g., one or more previous user inputs and/or system generated responses, etc.), time of day, geographic/device location, weather information, etc. In some embodiments, the other context retrieval component 112 may include the top-n identified context in the other context data 48. The other context data 48 may be sent (at step 4) to the action plan execution component 280 as shown in FIG. 2.

In some embodiments, the knowledge provider component may be configured to cause one or more of the API retrieval components, the exemplar retrieval component, the device state retrieval component, and the other context retrieval component to process based on the data output by one or more of the components of the knowledge provider component. For example, if the output of the API retrieval component (e.g., the API data 292) indicates that a related API definition was identified, then the knowledge provider component (or another component) may cause the exemplar retrieval component to process to determine one or more exemplars related to the identified API definitions. For further example, if the output of the API retrieval component (e.g., the API data 292) indicates that a particular API definition was identified (e.g., an API definition for controlling a device), then the knowledge provider component may cause the exemplar retrieval component to process as described above, and may further cause the device state retrieval component and/or the other context retrieval component to process to determine device states for one or more related devices and/or other contextual information based on the identified API definition being associated with controlling a device. In some embodiments, the knowledge provider component may determine to cause the components to process based on instruction(s) included in the action data (e.g., based on a determination made by preliminary action plan generation component 240, as discussed above).

The action plan execution component 280 may send (step 5) the data received from the API provider component 290 (e.g., the API data 292, the exemplar data 294, the device state data 296, and the other context data 48) to the LLM prompt generation component 250. The LLM prompt generation component 250 may be configured to generate prompt data 255 (e.g., using the user input data 227, the API data 292, the exemplar data 294, the device state data 296, and/or the other context data 48) to be used by the LLM 260.

In some examples, the LLM prompt generation component 250 may generate the prompt data 255 representing a prompt for input to the LLM 260. As previously described, in various examples, the LLM prompt generation component 250 may generate three separate prompts, as described in reference to FIG. 1, which may be used to generate three separate outputs, which may be combined by the contrastive decoder 126, as described above. In some embodiments, such prompt data 255 may be generated based on combining the user input data 227, the API data 292, the exemplar data 294, the device state data 296, and the other context data 48. The prompt data 255 may be an instruction to determine an action(s) responsive to the user input data 227 given the other information (e.g., the API data 292, the exemplar data 294, the device state data 296, the other context data 48) included in the prompt data 255. In some embodiments, the LLM prompt generation component 250 may also include in the prompt data 255 a sample processing format to be used by the LLM 260 when processing the prompt and generating the response. In some embodiments, the prompt data 255 may be generated according to a template format. For example, the prompt data 255 may adhere to a template format of:

{
You have access to the following API's:
[API(s) (e.g., the API data 192)]
Use the following format:
User: the input utterance of a user
Thought: optionally think about what to do
Action: take an action by calling APIs
Observation: what the API execution returns
. . . (this thought/action/action input/observation can repeat N times)
Thought: done
Response: the proper response to the user (end of turn)

Examples

[Exemplar(s) (e.g., the exemplar data 294)]
Context: [device state(s) (e.g., the device state data 296)] [other context(s) (e.g., the other context data 48)]
User: [the user input (e.g., the user input data 227)]
}

In some examples, the template format may instruct the LLM 260 as to how it should process to determine the action responsive to the user input and/or how it should generate the output including the action response to the user input. For example, as shown in the example above, the format may include the label "User:" labelling the following string of characters/tokens as the user input. For further example, the format may include the label "Thought:" instructing the LLM 260 to generate an output representing the determined interpretation of the user input by the LLM 260 (e.g., the user is requesting [intent of the user input], the user is trying to [intent of the user Input], etc.) As another example, the format may include the label "Observation:" labeling the following string of characters/tokens as the result of performance of an action determined by the LLM 260/the LLM 260's interpretation of the result of the performance of the action determined by the LLM 260. As a further example, the format may include a label of "Response:" instructing the LLM 260 to generate a response (e.g., a natural language output for a user) to the prompt.

Following such a template format, for example, and for a user input of "turn on the living room light" and corresponding API data, exemplar data, device state data, and other context data, the LLM prompt generation component 250 may generate example prompt data 255a:

{
You have access to the following API's:
Routine.turn_on_device (device: [device name]) turns a device on.
Use the following format:
User: the input utterance of a user
Thought: optionally think about what to do
Action: take an action by calling APIs
Observation: what the API execution returns
. . . (this thought/action/action input/observation can repeat N times)
Thought: done
Response: the proper response to the user (end of turn)

Examples

User: turn on all indoor lights
Thought: the user is trying to turn lights on
Action: turn_on_device (device="indoor light 1")
turn_on_device (device="indoor light 2")
Observation: success success
Thought: time to respond
Response: Anything else I can help you with?
Context: the user has the following devices, bathroom light, bedroom light, kitchen light, and living room light.
User: turn on the living room light.
}

In some embodiments, the LLM prompt generation component 250 may also include in the prompt data an instruction to output a response that satisfies certain conditions. Such conditions may relate to generating a response that is unbiased (toward protected classes, such as gender, race, age, etc.), non-harmful, profanity-free, etc. For example, the prompt data may include "Please generate a polite, respectful, and safe response and one that does not violate protected class policy."

The LLM 260 processes the prompt data 255 to generate model output data 265 representing an action responsive to the user input. For example, based on processing the example prompt data provided above, the LLM 260 may output model output data 265: {"Thought: the user is trying to turn on the living room light; Action: turn_on_device (device="living room light"),"} or the like. The model output data 265 is sent (at step 7) to the action plan generation component 270. The action plan generation component 270 may parse the model output data 265 to determine action plan data representing the action generated by the LLM 260. For example, for the model output data 265: "Action: turn_on_device (device="living room light")," the corresponding action plan data may correspond to "turn_on_device (device="living room light ")" (e.g., corresponding to the action generated by the LLM 260, without the label of "Action"). In some embodiments, the action plan generation component 270 may determine an API call corresponding to the "Action" data included in the model output data 265. For example, in some embodiments, the action plan generation component 270 may fill in the arguments/inputs, if any, for the API call, which may be included in the action plan data. For further example, in some embodiments, the action plan execution component 280 may fill in the arguments/inputs, if any, for the API call.

In some embodiments, the LLM orchestrator 230 (e.g., the action plan generation component 270 or another component of the LLM orchestrator 230) may determine whether the LLM 260 output satisfies certain conditions. Such conditions may relate to checking whether the output includes biased information (e.g., bias towards a protected class), harmful information (e.g., violence-related content, harmful content), profanity, content based on model hallucinations, etc. A model hallucination refers to when a model (e.g., a language model) generates a confident response that is not grounded in any of its training data. For example, the model may generate a response including a random number, which is not an accurate response to an input prompt, and then the model may continue to falsely represent that the random number is an accurate response to future input prompts. To check for an output being based on model hallucinations, the LLM orchestrator 230 may use a knowledge base, web search, etc. to fact-check information included in the output. The action plan may be sent to the action plan execution component 280 for execution (Step 8). In various examples, action plan generation component 270 and/or action plan execution component 280 may be implemented as the same logical system.

Figure 3A:
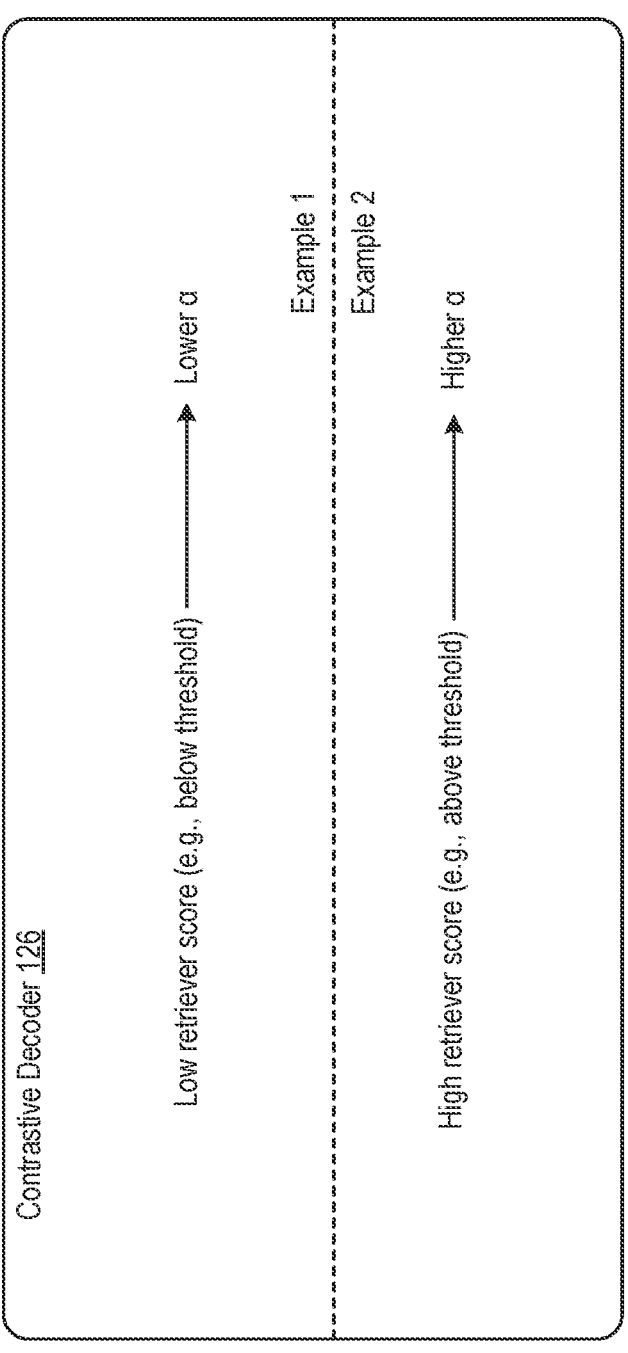
FIG. 3A depicts an example of dynamic determination of a hyperparameter that may be used to modulate LM attention to parametric knowledge, in accordance with various aspects of the present disclosure.

FIG. 3A depicts an example of dynamic determination of a hyperparameter a that may be used to modulate LM attention to parametric knowledge, in accordance with various aspects of the present disclosure. In various examples, the vector of logits generated by the LLM 260 (e.g., probability distributions 120, 122, and 124 in FIG. 1) may be vectors of non-normalized model scores/predictions where each element represents a different token (e.g., word) learned by the LLM 260 during training. Accordingly, a vector of logits may have a number of elements corresponding to each token in the LLM 260's vocabulary.

In an example shown in FIG. 3A, a confidence score and/or quality score output by the retriever component 112 may be used to dynamically adjust $\alpha$. In various examples, the retriever component 112 may comprise an encoder (e.g., BERT, DistilBERT, word2vec, etc.) that may encode the input query. In various examples, one or more linear layers may learn to project the encoding into an embedding space. The resulting embedding may be used to search for the most similar embedding in an indexed embedding space including indexed embeddings for the text corpus (e.g., an external corpus of text documents, etc., that may be searched for relevant context). The retriever component 112 may output a score indicating a quality level of the search results (e.g., for the top result, etc.). In various examples, $\alpha$ may be dynamically set based on the retriever score of the retriever component 112. Generally, higher retriever scores may result in higher values of $\alpha$ so that the contrastive decoder 126 attends more to the vector of logits $$z_t^+$$

(representing the model's answer generated using the relevant context). Conversely, lower retriever scores may result in lower values of $\alpha$ so that the contrastive decoder 126 attends more to the vector of logits $Z_t$ (representing the model's parametric knowledge) during training. Note that using the retriever score to select $\alpha$ can be performed during runtime at the per-input query level of granularity. However, the $\alpha$ value can be used for the dialog session, if desired.

In various examples, $\alpha$ may be dynamically proportionately to the retriever score. As previously described, alpha may be dynamically determined per input query, per dialog session, per dialog session turn (e.g., where a turn is a user input paired with a system response), per unit of time (e.g., every 10 seconds), and/or at some other desired cadence.

Figure 3B:
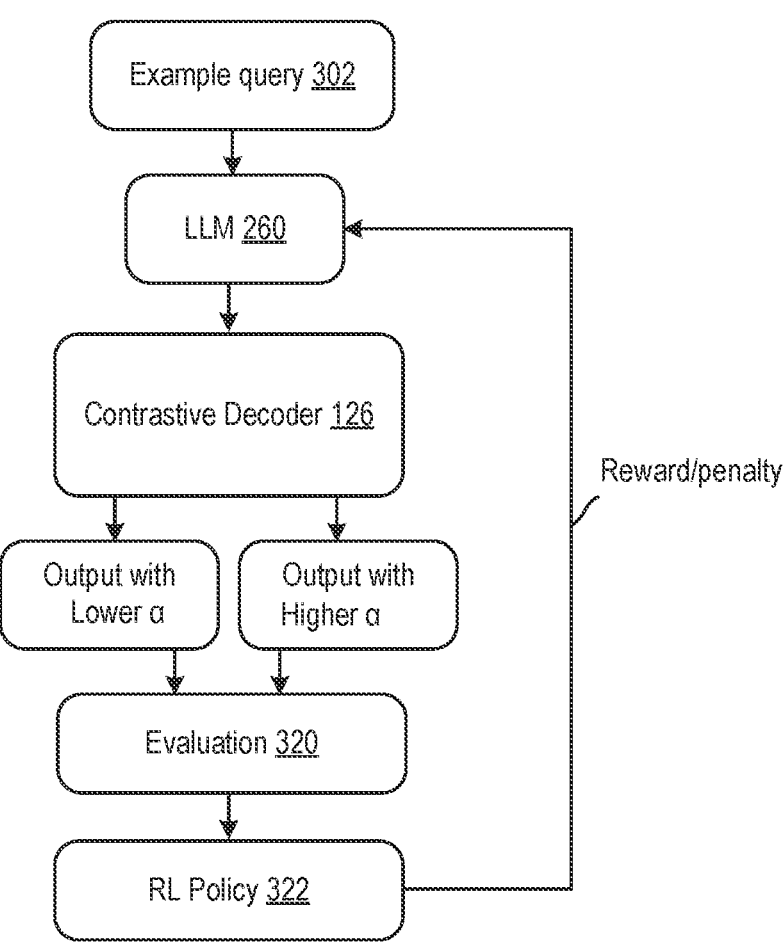
FIG. 3B depicts an example technique for training a contrastive decoder to dynamically modulate attention to parametric knowledge for a given input, in accordance with various aspects of the present disclosure.

FIG. 3B depicts an example technique for training a contrastive decoder to dynamically modulate attention to parametric knowledge for a given input, in accordance with various aspects of the present disclosure. In the example of FIG. 3B, the LLM 260 may perform inference as described above in reference to FIG. 1 (i.e., one inference using the parametric knowledge 116, one inference using the relevant context 118, and one inference using irrelevant context 114 for the input example query 302). The contrastive decoder 126 may decode the output tokens for the example query 302 twice using two different values of $\alpha$. An evaluation step 320 may generate evaluation data by evaluating the quality of the two different responses. Evaluation 320 may be performed by a human and/or by another LLM. This preference information may be used to train a reward model, and such a reward model may be used to train the LLM 260 to dynamically select $\alpha$. A reinforcement learning policy 322 may reward the LLM 260 and/or the contrastive decoder 126 for selecting a value for $\alpha$ that results in a higher-quality response for the given input query. Accordingly, a LLM 260 and/or contrastive decoder 126 trained in such a way may learn to dynamically select $\alpha$ for each input query during runtime. Accordingly, after training the LLM 260 using the example techniques depicted in FIG. 3B, the LLM 260 may dynamically determine a value for $\alpha$ for a given input query. This $\alpha$ value may be passed to the contrastive decoder 126 and used to decode the output, as described above.

Figure 4:
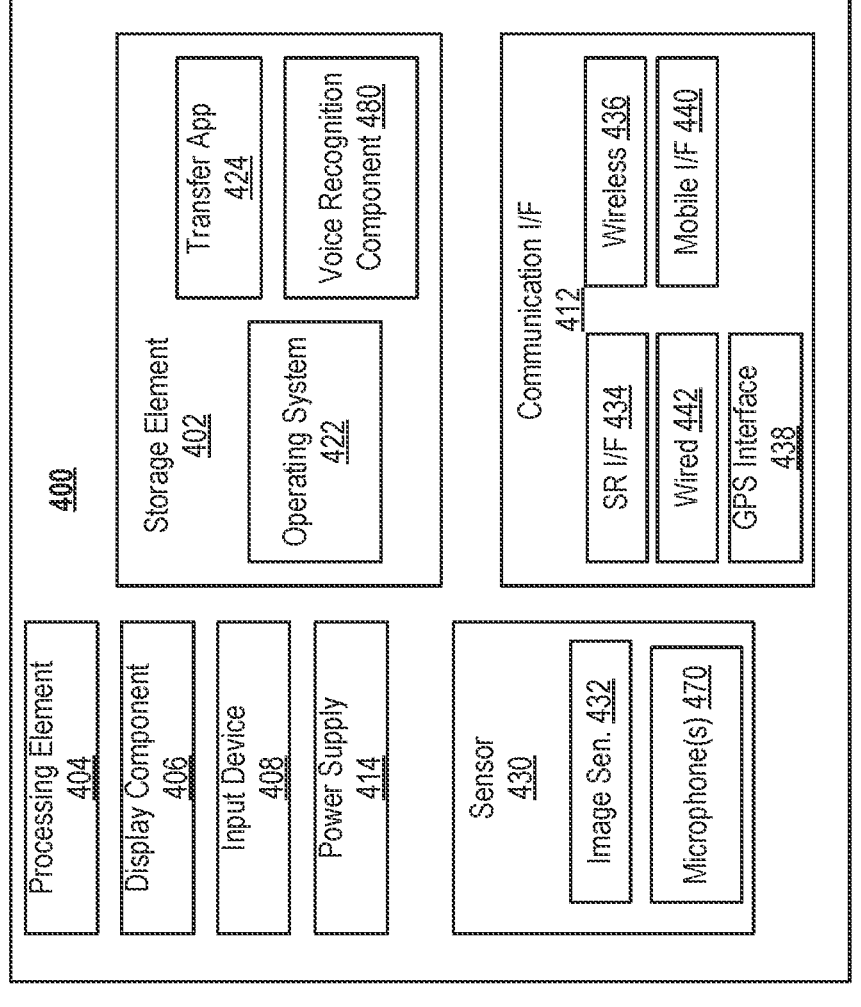
FIG. 4 is a block diagram showing an example architecture of a network-connected device that may be used in accordance with various embodiments described herein.

FIG. 4 is a block diagram showing an example architecture 400 of a network-connected device (e.g., a local network-connected device such as a natural language processing-enabled device or another input device) that may be used to implement, at least in part, a natural language processing-enable device configured to receive spoken and/or other natural input commands, in accordance with various aspects of the present disclosure. It will be appreciated that not all devices will include all of the components of the architecture 400 and some user devices may include additional components not shown in the architecture 400. The architecture 400 may include one or more processing elements 404 for executing instructions and retrieving data stored in a storage element 402. The processing element 404 may comprise at least one processor. Any suitable processor or processors may be used. For example, the processing element 404 may comprise one or more digital signal processors (DSPs). In some examples, the processing element 404 may be effective to determine a wakeword and/or to stream audio data to a speech processing system. The storage element 402 can include one or more different types of memory, data storage, or computer-readable storage media devoted to different purposes within the architecture 400. For example, the storage element 402 may comprise flash memory, random-access memory, disk-based storage, etc. Different portions of the storage element 402, for example, may be used for program instructions for execution by the processing element 404, storage of images or other digital works, and/or a removable storage for transferring data to other devices, etc. In various examples, the storage element 402 may comprise one or more components of the system 100 for LM hallucination mitigation using contrastive decoding.

The storage element 402 may also store software for execution by the processing element 404. An operating system 422 may provide the user with an interface for operating the computing device and may facilitate communications and commands between applications executing on the architecture 400 and various hardware thereof. A transfer application 424 may be configured to receive images, audio, and/or video from another device (e.g., a mobile device, image capture device, and/or display device) or from an image sensor 432 and/or microphone 470 included in the architecture 400. In some examples, the transfer application 424 may also be configured to send the received voice requests to one or more voice recognition servers.

When implemented in some user devices, the architecture 400 may also comprise a display component 406. The display component 406 may comprise one or more light-emitting diodes (LEDs) or other suitable display lamps. Also, in some examples, the display component 406 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 406 may be effective to display content determined provided by a skill executed by the processing element 404 and/or by another computing device.

The architecture 400 may also include one or more input devices 408 operable to receive inputs from a user. The input devices 408 can include, for example, a push button, touch pad, touch screen, wheel, joystick, keyboard, mouse, trackball, keypad, light gun, game controller, or any other such device or element whereby a user can provide inputs to the architecture 400. These input devices 408 may be incorporated into the architecture 400 or operably coupled to the architecture 400 via wired or wireless interface. In some examples, architecture 400 may include a microphone 470 or an array of microphones for capturing sounds, such as voice requests. Voice recognition component 480 may interpret audio signals of sound captured by microphone 470. In some examples, voice recognition component 480 may listen for a "wakeword" to be received by microphone 470. Upon receipt of the wakeword, voice recognition component 480 may stream audio to a voice recognition server for analysis, such as a speech processing system. In various examples, voice recognition component 480 may stream audio to external computing devices via communication interface 412.

When the display component 406 includes a touch-sensitive display, the input devices 408 can include a touch sensor that operates in conjunction with the display component 406 to permit users to interact with the image displayed by the display component 406 using touch inputs (e.g., with a finger or stylus). The architecture 400 may also include a power supply 414, such as a wired alternating current (AC) converter, a rechargeable battery operable to be recharged through conventional plug-in approaches, or through other approaches such as capacitive or inductive charging.

The communication interface 412 may comprise one or more wired or wireless components operable to communicate with one or more other computing devices. For example, the communication interface 412 may comprise a wireless communication module 436 configured to communicate on a network, such as a computer communication network, according to any suitable wireless protocol, such as IEEE 802.11 or another suitable wireless local area network (WLAN) protocol. A short range interface 434 may be configured to communicate using one or more short range wireless protocols such as, for example, near field communications (NFC), Bluetooth, Bluetooth LE, etc. A mobile interface 440 may be configured to communicate utilizing a cellular or other mobile protocol. A Global Positioning System (GPS) interface 438 may be in communication with one or more earth-orbiting satellites or other suitable position-determining systems to identify a position of the architecture 400. A wired communication module 442 may be configured to communicate according to the USB protocol or any other suitable protocol.

The architecture 400 may also include one or more sensors 430 such as, for example, one or more position sensors, image sensors, and/or motion sensors. An image sensor 432 is shown in FIG. 4. An example of an image sensor 432 may be a camera configured to capture color information, image geometry information, and/or ambient light information.

Figure 5:
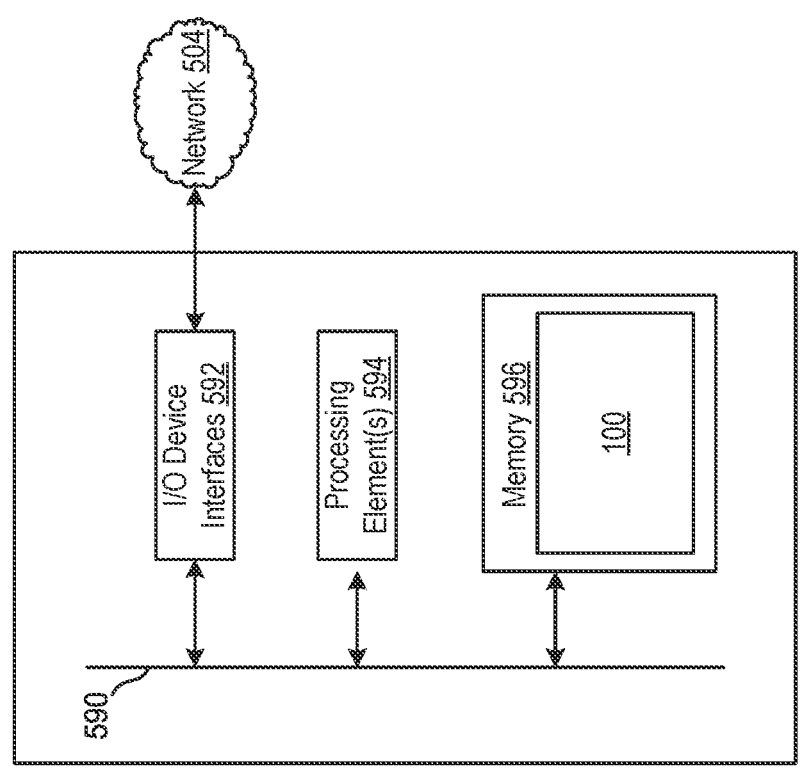
FIG. 5 is a block diagram showing an example architecture of a computing device that may be used in accordance with various embodiments described herein.

FIG. 5 is a block diagram conceptually illustrating example components of a remote device, such as a computing device executing a particular skill, a computing device executing one or more components of a speech processing system (e.g., ASR processing components, NLU processing components, applicable protocol recognition, etc.) and/or command processing. For example, the various components of FIG. 5 may be used to implement the system 100 for LM hallucination mitigation using contrastive decoding. Multiple computing devices may be included in the system, such as one speech processing computing device for performing ASR processing, one speech processing computing device for performing NLU processing, one or more skill computing device(s) implementing skills, etc. In operation, each of these devices (or groups of devices) may include non-transitory computer-readable and computer-executable instructions that reside on the respective device, as will be discussed further below. The remote device of FIG. 5 may communicate with one or more other devices over a network 504 (e.g., a wide area network or local area network).

Each computing device of a speech processing system may include one or more controllers/processors 594, which may each include at least one central processing unit (CPU) for processing data and computer-readable instructions, and a memory 596 for storing data and instructions of the respective device. In at least some examples, memory 596 may store, for example, a list of N-best intents data that may be generated for particular request data. In some examples, memory 596 may store machine learning models of the LLM 80, such as machine learned models associated with various classifiers and/or natural language inference models (described in reference to FIG. 1), when loaded from memory 596. In various further examples, memory 596 may be effective to store instructions effective to program controllers/processors 594 to perform the various techniques described above in reference to FIGS. 1-3B. Accordingly, in FIG. 5, the system 100 for contrastive decoding is depicted as being stored within memory 596, as an example. The memories 596 may individually include volatile random access memory (RAM), non-volatile read only memory (ROM), non-volatile magnetoresistive memory (MRAM), and/or other types of memory. Each computing device of a speech processing system (and/or a component thereof) may also include memory 596 for storing data and controller/processor-executable instructions. Each memory 596 may individually include one or more non-volatile storage types such as magnetic storage, optical storage, solid-state storage, etc. Each computing device of a speech processing system may also be connected to removable or external non-volatile memory and/or storage (such as a removable memory card, memory key drive, networked storage, etc.) through respective input/output device interfaces 592. In various examples, the feature data and/or training data used by the various machine learning models may be stored and/or cached in memory 596.

Computer instructions for operating each computing device of a natural language processing system may be executed by the respective device's controllers/processors 594, using the memory 596 as temporary "working" storage at runtime. A device's computer instructions may be stored in a non-transitory manner in non-volatile memory 596 (e.g., a non-transitory computer-readable memory), memory 596, or an external device(s). Alternatively, some or all of the executable instructions may be embedded in hardware or firmware on the respective device in addition to or instead of software.

Each computing device of the various computing devices described herein may include input/output device interfaces 592. A variety of components may be connected through the input/output device interfaces 592, as will be discussed further below. Additionally, each computing device of a speech processing system may include an address/data bus

590 for conveying data among components of the respective device. Each component within a computing device of a speech processing system may also be directly connected to other components in addition to (or instead of) being connected to other components across the bus 590.

As noted above, multiple devices may be employed in a single system. In such a multi-device system, each of the devices may include different components for performing different aspects of the system's processing. The multiple devices may include overlapping components. The components of a speech processing system, as described herein, are exemplary, and may be located as a stand-alone device or may be included, in whole or in part, as a component of a larger device or system.

FIG. 6 is a flow chart illustrating an example process 600 for LM inference using contrastive decoding, in accordance with embodiments of the present disclosure. The process 600 of FIG. 6 may be executed by one or more computing devices. The actions of process 600 may represent a series of instructions comprising computer-readable machine code executable by a processing unit of a computing device. In various examples, the computer-readable machine code may be comprised of instructions selected from a native instruction set of the computing device and/or an operating system of the computing device. Various actions in process 600 may be described above with reference to elements of FIGS. 1-5. Although shown in a particular order, the steps of process 600 may instead be performed in a different order. Additionally, various steps may be performed in parallel in various implementations. Further, some steps may be omitted and/or other steps may be added in accordance with the LM hallucination mitigation using contrastive decoding techniques described herein.

Process 600 may begin at action 602, at which a first natural language input may be received. The first natural language input may be text representing a user request (e.g., spoken or typed). In some examples, the first natural language input may be or comprise source code. In some examples, the first natural language input may be encoded and/or tokenized.

Processing may continue at action 604, at which context data that is determined to be relevant to the first natural language input may be determined. For example, the context data may be retrieved by searching a data corpus using the first natural language input (or a representation thereof) as a search query. In an example, a knowledge graph may be searched using the first natural language input as a query. In some examples, a retriever component (e.g., retriever component 112) may be used to retrieve relevant context data for the first natural language input. The retriever component may be any type of search/retrieval tool and may be accessed by an LLM using an API for the retriever component.

Processing may continue at action 606, at which adversarial data determined to be irrelevant to the first natural language input may be determined. The adversarial data may be predefined nonsensical information and/or may be determined based on a dissimilarity with respect to the relevant context data retrieved at action 604. The adversarial data may be used by the contrastive decoder as a negative example.

Processing may continue at action 608, at which first prompt data may be generated that includes the first natural language input. At action 610, second prompt data may be generated that includes the first natural language input and the context data retrieved at action 604. At action 612, third prompt data including the first natural language input and the adversarial data retrieved at action 606 may be determined. It should be noted that some of the actions in FIG. 6 may optionally be performed in parallel. For example, two or more of the actions 608, 610, and 612 may be performed in parallel, if desired.

Processing may continue at action 614, at which a first LLM may generate first logit data based on the first prompt data, second logit data based on the second prompt data, and third logit data based on the third prompt data. For example, LLM 260 (or any LM) may be instructed to perform inference three different times (e.g., once for the first prompt data, once for the second prompt data, and once for the third prompt data) to generate three separate encoded outputs (e.g., encoded outputs 120, 122, and 124). The first logit data may be generated using the LLM 260's parametric knowledge 116 since the first prompt data included the input query (e.g., the first natural language input received at action 602) without any context data. The second logit data may be generated using the relevant context since the second prompt data included both the input query and the context data retrieved at action 604. The third logit data may be generated using the adversarial data generated at action 606.

Processing may continue at action 616, at which a first output token may be generated using a contrastive decoder by combining the first logit data, the second logit data, and the third logit data in a weighted combination. For example, the first logit data, the second logit data, and the third logit data may be linearly combined as described above, using the scalar value a to weight the relevant amount of importance of the context data $$\text{(e.g., using } y_t \sim softmax[Z_t + \alpha(Z_t^+ - Z_t^-)]).$$

This output is a vector of logits (and/or a vector representing a probability distribution if softmax is used on the vector of logits). This output vector of logits may be sampled from using any desired approach in order to determine the output tokens (e.g., beam search, greedy decoding, etc.). As previously described, $\alpha$ may be dynamically determined for each query (or for each dialog session), may be learned by the LM, or may be a static value. At action 618, first output data may be generated that includes the first output token.

Figure 7:
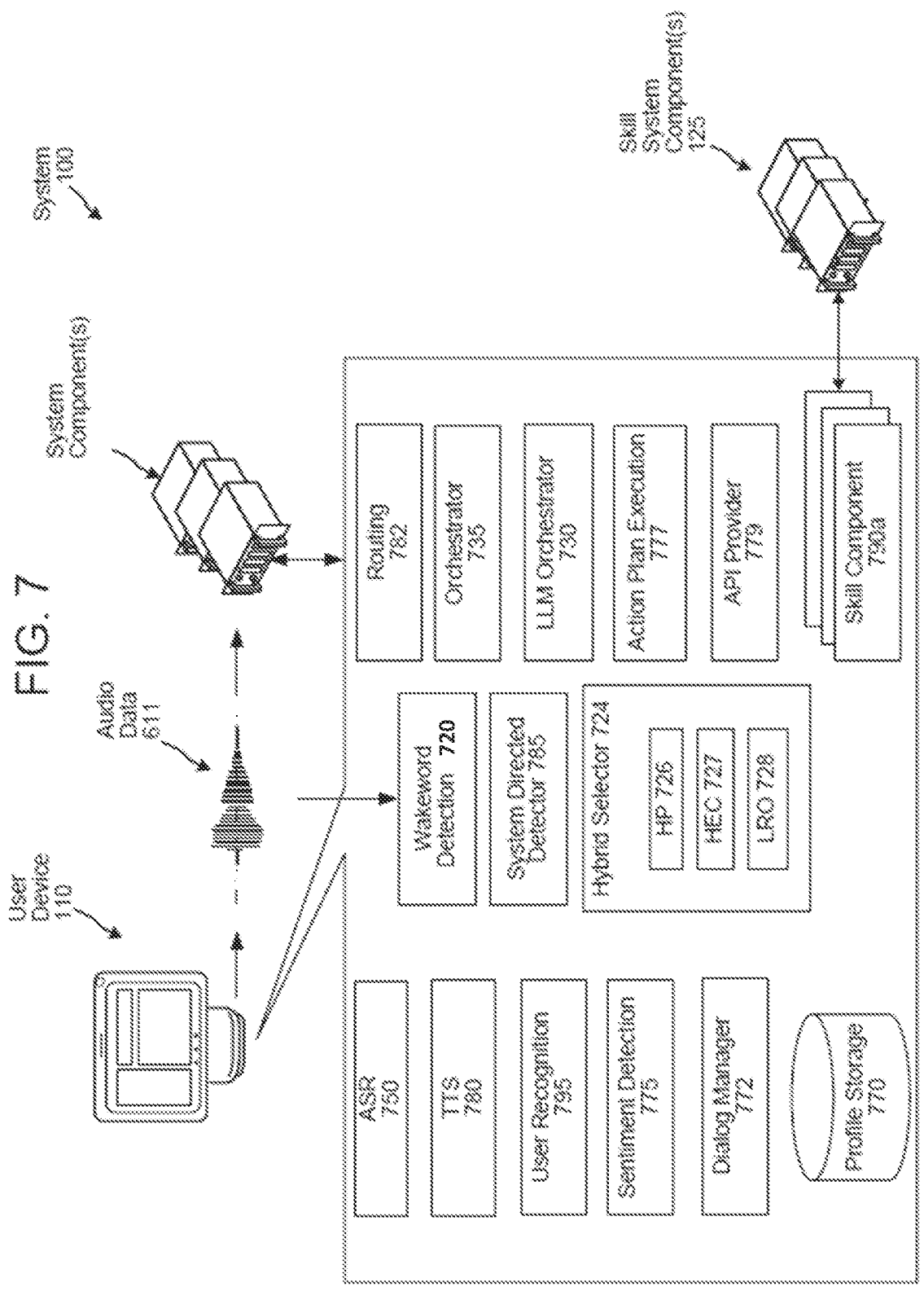
FIG. 7 is a conceptual diagram illustrating components that may be included in a device, according to embodiments of the present disclosure.

FIG. 7 is a conceptual diagram illustrating components that may be included in a device, according to embodiments of the present disclosure. In at least some embodiments, the system component(s) may receive the audio data 611 from the input device 102, to recognize speech corresponding to a spoken input in the received audio data 611, and to perform functions in response to the recognized speech. In at least some embodiments, these functions involve sending directives (e.g., commands), from the system component(s) to the input device 102 (and/or other input devices 102) to cause the input device 102 to perform an action, such as output an audible response to the spoken input via a loudspeaker(s), and/or control secondary devices in the environment by sending a control command to the secondary devices.

Thus, when the input device 102 is able to communicate with the system component(s) over the network(s) 199, some or all of the functions capable of being performed by the system component(s) may be performed by sending one or more directives over the network(s) 199 to the input device 102, which, in turn, may process the directive(s) and perform one or more corresponding actions. For example, the system component(s), using a remote directive that is included in response data (e.g., a remote response), may instruct the input device 102 to output an audible response (e.g., using TTS processing performed by an on-device TTS component 780) to a user's question via a loudspeaker(s) of (or otherwise associated with) the input device 102, to output content (e.g., music) via the loudspeaker(s) of (or otherwise associated with) the input device 102, to display content on a display of (or otherwise associated with) the input device 102, and/or to send a directive to a secondary device (e.g., a directive to turn on a smart light). It is to be appreciated that the system component(s) may be configured to provide other functions in addition to those discussed herein, such as, without limitation, providing step-by-step directions for navigating from an origin location to a destination location, conducting an electronic commerce transaction on behalf of the user as part of a shopping function, establishing a communication session (e.g., a video call) between the user and another user, and so on.

The input device 102 may include a wakeword detection component 720 configured to compare the audio data 611 to stored models used to detect a wakeword (e.g., "Alexa") that indicates to the input device 102 that the audio data 611 is to be processed by the device 110 (e.g., by the orchestrator 735 and/or the LLM orchestrator 730, which are configured similar to the orchestrator component 630 and the LLM orchestrator 130 respectively). In at least some embodiments, a hybrid selector 724, of the input device 102, may send the audio data 611 to the wakeword detection component 720. If the wakeword detection component 720 detects a wakeword in the audio data 611, the wakeword detection component 720 may send an indication of such detection to the hybrid selector 724. In response to receiving the indication, the hybrid selector 724 may send the audio data 611 to the system component(s) and/or the ASR component 750. The wakeword detection component 720 may also send an indication, to the hybrid selector 724, representing a wakeword was not detected. In response to receiving such an indication, the hybrid selector 724 may refrain from sending the audio data 611 to the system component(s), and may prevent the ASR component 750 from further processing the audio data 611. In this situation, the audio data 611 can be discarded.

The input device 102 may conduct its own speech processing using on-device language processing components, such as an ASR component 750, similar to the manner discussed herein with respect to the ASR component 650 of the system component(s). ASR component 750 may operate similarly to ASR component 650. The input device 102 may also internally include, or otherwise have access to, other components such as one or more skill components 790 capable of executing commands based on the output of the orchestrator 735, the LLM orchestrator 730, or other results determined by the input device 102/system component(s) (which may operate similarly to skill components 570), a routing component 782 (configured to process in a similar manner to that discussed herein with respect to the routing component 682), an action plan execution component 777 (configured to process in a similar manner to that discussed herein with respect to the action plan execution component 180), an API provider component 779 (configured to process in a similar manner to that discussed herein with respect to an API provider component 290), a user recognition component 795 (configured to process in a similar manner to that discussed herein with respect to the user recognition component 695 of the system component(s)), profile storage 770 (configured to store similar profile data to that discussed herein with respect to the profile storage 670 of the system component(s)), or other components. In at least some embodiments, the profile storage 770 may only store profile data for a user or group of users specifically associated with the input device 102. Similar to as described above with respect to skill component 570, a skill component 790 may communicate with a skill system component(s) 125. The input device 102 may also have its own TTS component 780. The TTS component 780 may operate similarly to TTS component 520.

In at least some embodiments, the on-device language processing components may not have the same capabilities as the language processing components of the system component(s). For example, the on-device language processing components may be configured to handle only a subset of the natural language user inputs that may be handled by the system component(s). For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system component(s). If the input device 102 attempts to process a natural language user input for which the on-device language processing components are not necessarily best suited, the language processing results determined by the input device 102 may indicate a low confidence or other metric indicating that the processing by the input device 102 may not be as accurate as the processing done by the system component(s).

The hybrid selector 724, of the input device 102, may include a hybrid proxy (HP) 726 configured to proxy traffic to/from the system component(s). For example, the HP 726 may be configured to send messages to/from a hybrid execution controller (HEC) 727 of the hybrid selector 724. For example, command/directive data received from the system component(s) can be sent to the HEC 727 using the HP 726. The HP 726 may also be configured to allow the audio data 611 to pass to the system component(s) while also receiving (e.g., intercepting) this audio data 611 and sending the audio data 611 to the HEC 727.

In at least some embodiments, the hybrid selector 724 may further include a local request orchestrator (LRO) 728 configured to notify the ASR component 750 about the availability of new audio data 611 that represents user speech, and to otherwise initiate the operations of local language processing when new audio data 611 becomes available. In general, the hybrid selector 724 may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the input device 102 receives directive data from the system component(s) and chooses to use that remotely-determined directive data.

Thus, when the audio data 611 is received, the HP 726 may allow the audio data 611 to pass through to the system component(s) and the HP 726 may also input the audio data 611 to the on-device ASR component 750 by routing the audio data 611 through the HEC 727 of the hybrid selector 724, whereby the LRO 728 notifies the ASR component 750 of the audio data 611. At this point, the hybrid selector 724 may wait for response data from either or both of the system component(s) or the local language processing components. However, the disclosure is not limited thereto, and in some examples the hybrid selector 724 may send the audio data

611 only to the local ASR component 750 without departing from the disclosure. For example, the input device 102 may process the audio data 611 locally without sending the audio data 611 to the system component(s).

The local ASR component 750 is configured to receive the audio data 611 from the hybrid selector 724, and to recognize speech in the audio data 611. The input device 102 and/or the system component(s) may associate a unique identifier with each natural language user input. The input device 102 may include the unique identifier when sending the audio data 611 to the system component(s), and the response data from the system component(s) may include the unique identifier to identify which natural language user input the response data corresponds.

In at least some embodiments, the input device 102 may include, or be configured to use, one or more skill components 790 that may work similarly to the skill component(s) 570 implemented by the system component(s). The skill component(s) 790 may correspond to one or more domains that are used in order to determine how to act on a spoken input in a particular way, such as by outputting a directive that corresponds to the determined intent, and which can be processed to implement the desired operation. The skill component(s) 790 installed on the input device 102 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally, or alternatively, the input device 102 may be in communication with one or more skill system component(s) 125. For example, a skill system component(s) 125 may be located in a remote environment (e.g., separate location) such that the input device 102 may only communicate with the skill system component(s) 125 via the network(s) 199. However, the disclosure is not limited thereto. For example, in at least some embodiments, a skill system component(s) 125 may be configured in a local environment (e.g., home server and/or the like) such that the input device 102 may communicate with the skill system component(s) 125 via a private network, such as a local area network (LAN).

As used herein, a "skill" may refer to a skill component 790, a skill system component(s) 125, or a combination of a skill component 790 and a corresponding skill system component(s) 125.

The local input device 102 may be configured to recognize multiple different wakewords and/or perform different categories of tasks depending on the wakeword. Such different wakewords may invoke different processing components of local input device 102 (not illustrated in FIG. 7). For example, detection of the wakeword "Alexa" by the wakeword detection component 720 may result in sending audio data to certain language processing components (e.g., the ASR component 750)/skill components 790 for processing while detection of the wakeword "Computer" by the wakeword detector may result in sending audio data different language processing components/skill components 790 for processing.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method comprising:
receiving a first natural language input;
determining, using a first context retrieval component, first context data determined to be relevant to the first natural language input;
generating first adversarial data determined to be irrelevant to the first natural language input;
generating first prompt data comprising the first natural language input;
generating second prompt data comprising the first natural language input and the first context data;
generating third prompt data comprising the first natural language input and the first adversarial data;
generating, by a first language model (LM) using the first prompt data, a first vector of logits representing a first output of the first LM generated using parametric knowledge of the first LM learned during training;

generating, by the first LM using the second prompt data, a second vector of logits representing a second output of the first LM;
generating, by the first LM using the third prompt data, a third vector of logits representing a third output of the first LM;
predicting, by a contrastive decoder, a first output token by combining the first vector of logits, the second vector of logits, and the third vector of logits in a weighted combination; and
generating first output data comprising the first output token as a natural language output.

2. The computer-implemented method of claim 1, further comprising:
determining a difference vector representing a difference between the second vector of logits and the third vector of logits;
generating a weighted difference by multiplying the difference vector by a scalar hyperparameter a;
generating a combined vector of logits by adding the first vector of logits to the weighted difference; and
determining, by the contrastive decoder, the first output token using the combined vector of logits.

3. The computer-implemented method of claim 1, further comprising:
determining a first confidence value of the first context retrieval component associated with the second vector of logits; and
determining a scalar hyperparameter a used to generate the weighted combination that is proportional to the first confidence value.

4. The computer-implemented method of claim 1, further comprising:
determining, by the contrastive decoder, a second output token using the first vector of logits;
generating second output data comprising the second output token;
determining, by the contrastive decoder, a third output token using the second vector of logits;
generating third output data comprising the third output token;
receiving first evaluation data indicating that the third output data represents a more relevant response to the first natural language input relative to the second output data; and
updating parameters of the first LM based at least in part on the first evaluation data.

5. A method comprising:
receiving a first natural language input;
generating, by a first language model (LM), a first vector of logits based on first prompt data comprising the first natural language input;
generating, by the first LM, a second vector of logits based on second prompt data comprising the first natural language input and first context data associated with the first natural language input;
generating, by the first LM, a third vector of logits based on third prompt data comprising the first natural language input and first adversarial data; and
generating, by a contrastive decoder, first output data based on a combination of the first vector of logits, the second vector of logits, and the third vector of logits, wherein the first output data is a natural language output.

6. The method of claim 5, further comprising:
generating, by the first LM, a first application programming interface (API) call to a first retrieval component, wherein the first API call comprises a representation of the first natural language input; and receiving, based on the first API call, the first context data.

7. The method of claim 5, further comprising:

generating first embedding data representing the first context data; and determining second embedding data representing the first adversarial data based at least in part on a first distance in an embedding space between the first embedding data and the second embedding data.

8. The method of claim 5, further comprising sampling the first adversarial data from among text data that is irrelevant to the first natural language input.

9. The method of claim 5, further comprising:

determining difference data representing a difference between the second vector of logits and the third vector of logits; and determining a first output token based at least in part on a combination of the difference data and the first vector of logits.

10. The method of claim 9, further comprising:

determining a first weight value for the decoder; and determining the difference data by multiplying the first weight value by the difference between the second vector of logits and the third vector of logits.

11. The method of claim 5, further comprising:

determining a first score for the first context data, the first score representing a predicted relevance of the first context data to the first natural language input;

determining a first weight parameter based at least in part on the first score for the first context data; and determining the combination of the first vector of logits, the second vector of logits, and the third vector of logits using the first weight parameter.

12. The method of claim 5, further comprising:

generating, by the decoder, second output data using the first vector of logits;

generating, by the decoder, third output data using the second vector of logits;

receiving first evaluation data indicating that the third output data represents a more relevant response to the first natural language input relative to the second output data; and updating parameters of the decoder based at least in part on the first evaluation data.

13. A system comprising:

at least one processor; and non-transitory computer-readable memory storing instructions that, when executed by the at least one processor, are effective to:

receive a first natural language input;

generate, by a first language model (LM), a first vector of logits based on first prompt data comprising the first natural language input;

generate, by the first LM, a second vector of logits based on second prompt data comprising the first natural language input and first context data associated with the first natural language input;

generate, by the first LM, a third vector of logits based on third prompt data comprising the first natural language input and first adversarial data; and generate, by a contrastive decoder, first output data based on a combination of the first vector of logits, the second vector of logits, and the third vector of logits, wherein the first output data is a natural language output.

14. The system of claim 13, the non-transitory computer-readable memory storing further instructions that, when executed by the at least one processor, are further effective to:

generate, by the first LM, a first application programming interface (API) call to a first retrieval component, wherein the first API call comprises a representation of the first natural language input; and receive, based on the first API call, the first context data.

15. The system of claim 13, the non-transitory computer-readable memory storing further instructions that, when executed by the at least one processor, are further effective to:

generate first embedding data representing the first context data; and determine second embedding data representing the first adversarial data based at least in part on a first distance in an embedding space between the first embedding data and the second embedding data.

16. The system of claim 13, the non-transitory computer-readable memory storing further instructions that, when executed by the at least one processor, are further effective to:

sample the first adversarial data from among text data that is irrelevant to the first natural language input.

17. The system of claim 13, the non-transitory computer-readable memory storing further instructions that, when executed by the at least one processor, are further effective to:

determine difference data representing a difference between the second vector of logits and the third vector of logits; and determine a first output token based at least in part on a combination of the difference data and the first vector of logits.

18. The system of claim 17, the non-transitory computer-readable memory storing further instructions that, when executed by the at least one processor, are further effective to:

determine a first weight value for the decoder; and determine the difference data by multiplying the first weight value by a difference between the second vector of logits and the third vector of logits.

19. The system of claim 13, the non-transitory computer-readable memory storing further instructions that, when executed by the at least one processor, are further effective to:

determine a first score for the first context data, the first score representing a predicted relevance of the first context data to the first natural language input;

determine a first weight parameter based at least in part on the first score for the first context data; and determine the combination of the first vector of logits, the second vector of logits, and the third vector of logits using the first weight parameter.

20. The system of claim 13, the non-transitory computer-readable memory storing further instructions that, when executed by the at least one processor, are further effective to:

generate, by the decoder, second output data using the first vector of logits;

generate, by the decoder, third output data using the second vector of logits;

receive first evaluation data indicating that the third output data represents a more relevant response to the first natural language input relative to the second output data; and update parameters of the decoder based at least in part on
the first evaluation data.

* * * * *